United States Patent [19]

Kobuck et al.

[11] Patent Number: 4,581,801
[45] Date of Patent: Apr. 15, 1986

[54] SLEEVING METHOD

[75] Inventors: Richard M. Kobuck, Delmont; John J. Wilhelm, New Kensington; Mark E. Wylie, Monroeville, all of Pa.

[73] Assignee: Westinghouse Electric Corp., Pittsburgh, Pa.

[21] Appl. No.: 559,847

[22] Filed: Dec. 9, 1983

Related U.S. Application Data

[63] Continuation of Ser. No. 297,671, Aug. 31, 1981, abandoned.

[51] Int. Cl.⁴ .................... B21D 53/00; B21K 29/00; B23P 15/26
[52] U.S. Cl. ................. 29/157.4; 29/402.09; 29/523; 165/173; 285/382.4
[58] Field of Search .............. 29/523, 157.5, 157.4, 29/283.5, 402.09, 402.19; 285/382.4; 165/164, 172, 173, 176

[56]  References Cited

U.S. PATENT DOCUMENTS

| | | | |
|---|---|---|---|
| 789,622 | 5/1905 | McCullough | 29/157.5 |
| 904,189 | 11/1908 | Everson | 29/523 |
| 1,304,954 | 5/1919 | Foster | 29/157.4 UX |
| 1,494,128 | 5/1924 | Primrose | 29/157.4 UX |
| 1,646,384 | 10/1927 | Bergstrom | 29/523 UX |
| 2,092,358 | 9/1937 | Robertson | 285/382.4 X |
| 2,228,018 | 1/1941 | Scholtes | 285/382.4 X |
| 2,275,451 | 3/1942 | Maxwell | 29/157.5 |
| 2,686,353 | 8/1954 | Swarthout | 29/523 UX |
| 2,787,481 | 4/1957 | Buschow et al. | 285/382.4 X |
| 2,821,323 | 1/1958 | Lee, II | 29/523 UX |
| 4,069,573 | 1/1978 | Rogers, Jr. et al. | 29/402.09 X |
| 4,369,662 | 1/1983 | Rieben et al. | 29/522 R X |
| 4,390,042 | 6/1983 | Kurcherer | 29/523 X |

FOREIGN PATENT DOCUMENTS

| | | | |
|---|---|---|---|
| 1581657 | 9/1969 | France. | |
| 2183359 | 12/1973 | France. | |
| 47703 | 3/1977 | Japan | 29/402.09 |
| 47910 | 10/1979 | Japan | 29/402.09 |
| 788505 | 1/1958 | United Kingdom. | |

Primary Examiner—Charlie T. Moon
Attorney, Agent, or Firm—L. A. DePaul

[57]  ABSTRACT

The sleeving method comprises inserting a metal sleeve within a tube so as to bridge the defective region of the tube. The sleeve is constructed to have annular slots on the outside thereof that are capable of tightly contacting the inside surface of the defective tube and creating a labyrinth-type seal therebetween. The sleeve is also constructed to have an expander member captured therein that may be pulled through the sleeve thereby causing expansion of those portions of the sleeve having the annular slots therein. Once such a sleeve has been inserted into the defective tube, the sleeve is internally expanded in the area of the sleeve wherein the annular slots are located by pulling the expander member through the sleeve. The expansion of the sleeve in the area wherein the annular slots are located causes the lands between each annular slot to closely contact the inside surface of the tube. The other end of the sleeve can then be either similarly attached to the tube or otherwise attached to the tube.

3 Claims, 2 Drawing Figures

SLEEVING METHOD

CROSS-REFERENCE TO RELATED APPLICATIONS

This application is a continuation of application Ser. No. 297,671, filed Aug. 31, 1981, now abandoned.

This application is related to copending application Ser. No. 185,656 filed Sept. 9, 1980 now U.S. Pat. No. 4,368,571, in the name of F. W. Cooper, Jr. and entitled "Sleeving Method" which is assigned to the Westinghouse Electric Corporation.

BACKGROUND OF THE INVENTION

This invention relates to tube repair methods and more particularly to methods for attaching a sleeve within a tube.

In tube type heat exchangers, a first fluid flows through the tubes of the heat exchanger while a second fluid surrounds the outside of the tubes such that heat exchange occurs between the two fluids. Occasionally, one of the tubes can become defective such that a leak occurs therein which allows the fluids to mingle. When this occurs, it is sometimes necessary to plug the tube so that the fluid does not flow through the tube, thereby preventing leakage from the tube.

In nuclear reactor power plants, the tube type heat exchangers are commonly referred to as steam generators. When a defect occurs in the tubes of a nuclear steam generator that allows the coolant in the tubes to mingle with the coolant outside of the tubes, a more significant problem arises. Not only does this situation create an ineffective heat exchanger, but it also creates a radioactive contamination problem. Since the fluid flowing in the tubes of a nuclear steam generator is generally radioactive, it is important that it not be allowed to leak from the tubes and contaminate the fluid surrounding the tubes. Therefore, when a leak occurs in a nuclear steam generator heat exchange tube, the heat exchange tube must be either plugged or repaired so that the coolant does not leak from the tube. This prevents contamination of the fluid surrounding the tubes.

There are several methods known in the art for repairing heat exchange tubes; however, many of these methods are not applicable to repair of heat exchange tubes wherein the tube is not readily accessible. For example, in a nuclear steam generator the physical inaccessibility of defective heat exchange tubes and the radioactive nature of the environment surrounding the heat exchange tubes presents unique problems to repairing heat exchange tubes that do not normally exist in other heat exchangers. For these reasons, special methods have been developed for repairing heat exchange tubes in nuclear steam generators. Typically, the method used to repair a heat exchange tube in a nuclear steam generator is one in which a metal sleeve having an outside diameter slightly smaller than the inside diameter of the defective tube is inserted into the defective tube and attached to the defective tube to bridge the defective area of the tube. This type of repair method is generally referred to as "sleeving". Previous sleeving development work has been concerned with obtaining a relatively leakproof joint between the sleeve and the tube by brazing, arc welding, explosive welding, or other joining means. Due to the need for cleanliness, close fittings, heat application, and atmospheric control, these metalurigical bonding techniques have problems which are not easily solvable in areas such as a nuclear steam generator where human access is limited.

One particular method of securing a sleeve within a tube is described in U.S. Pat. No. 4,069,573, issued Jan. 24, 1978 to Rogers, Jr. et al. In the patent to Rogers, Jr. et al., the sleeve is positioned within the tube so that it extends coextensive with the region of degraded tube wall and partially beyond the axial extremes of the degraded area. A radially outwardly directed force is then applied to the tubular sleeve from within along a portion of the sleeve at each end, extending beyond the degraded area. The force is sufficient to cause outward plastic deformation of both the sleeve and the tube resulting in an interference mechanical joint therebetween. As stated in the patent to Rogers, Jr. et al., the method as described therein does not produce a leak tight joint.

While there are methods known in the art for inserting sleeves within tubes of heat exchangers, there do not exist methods for inserting sleeves in nuclear steam generator heat exchange tubes which are capable of being performed where personnel access is limited and wherein a relatively leak tight joint is established. Therefore, what is needed is a method for securing a sleeve within a heat exchange tube of a nuclear steam generator that produces a relatively leak tight joint between the sleeve and the tube so that no leakage occurs from the tube in the defective region.

SUMMARY OF THE INVENTION

The sleeving method comprises inserting a metal sleeve within a tube so as to bridge the defective region of the tube. The sleeve is constructed to have annular slots on the outside thereof that are capable of tightly contacting the inside surface of the defective tube and creating a labyrinth-type seal therebetween. The sleeve is also constructed to have an expander member captured therein that may be pulled through the sleeve thereby causing expansion of those portions of the sleeve having the annular slots therein. Once such a sleeve has been inserted into the defective tube, the sleeve is internally expanded in the area of the sleeve wherein the annular slots are located by pulling the expander member through the sleeve. The expansion of the sleeve in the area wherein the annular slots are located causes the lands between each annular slot to closely contact the inside surface of the tube. The other end of the sleeve can then be either similarly attached to the tube or otherwise attached to the tube.

BRIEF DESCRIPTION OF THE DRAWINGS

While the specification concludes with claims particularly pointing and distinctly claiming the subject matter of the invention, it is believed the invention will be better understood from the following description, taken in conjunction with the accompanying drawings, wherein:

DESCRIPTION OF THE PREFERRED EMBODIMENT

When a heat exchange tube in a nuclear steam generator becomes defective, it becomes necessary to either plug the heat exchange tube or to repair the defective area. The invention described herein provides a method for repairing the defective area in a heat exchange tube in a nuclear steam generator by bridging the defective area with a metal sleeve.

Figure 1:
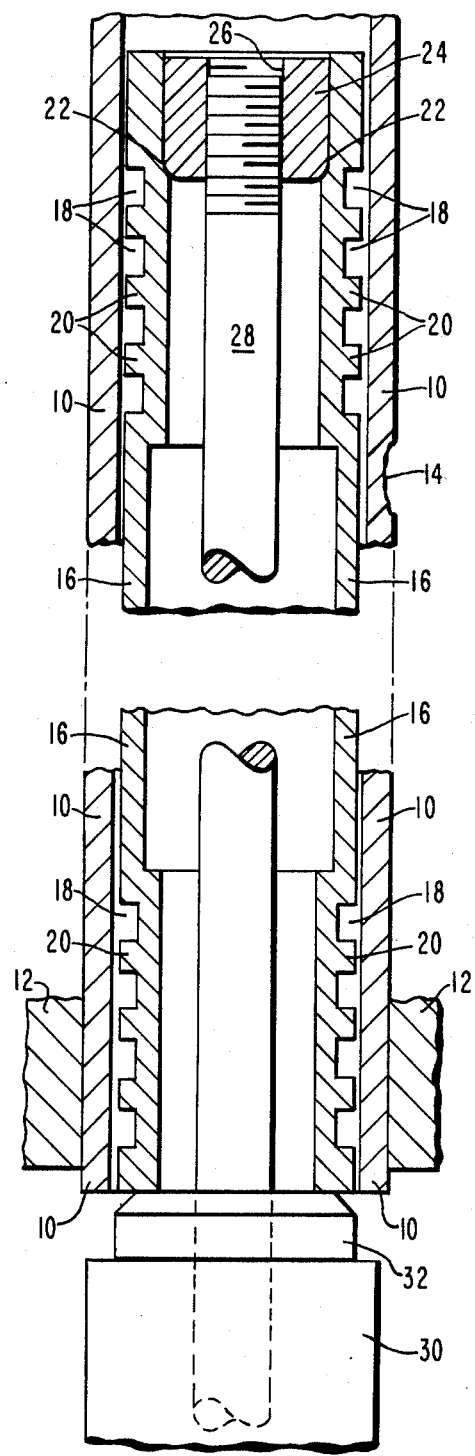
FIG. 1 is a cross-sectional view in elevation of a sleeve and expander apparatus disposed within a heat exchange tube.

Referring now to FIG. 1, the nuclear steam generator (not shown) comprises a plurality of heat exchange tubes 10 which may be U-shaped tubes and are attached at each end to a tubesheet 12. During operation of the nuclear steam generator, reactor coolant flows through the heat exchange tubes 10 in a manner so as to heat fluid surrounding the tubes 10. The fluid around the tubes 10 is converted to steam to produce electricity in a conventional manner. Since the reactor coolant flowing through heat exchange tubes 10 has passed through the nuclear reactor, it is radioactive. Therefore, it is important to isolate the coolant flowing through the tubes from the fluid surrounding the tubes. When a defect develops in heat exchange tube 10 such as defect 14, it is necessary to either plug heat exchange tube 10 or repair the area surrounding defect 14 so that no coolant leaks through defect 14. One method of repairing defect 14 is by inserting a metal sleeve 16 into heat exchange tube 10 in a manner so as to bridge the defective area.

Still referring to FIG. 1, sleeve 16 may be a metal tube made of a material such as Inconel and may have a plurality of annular slots 18 on the outside surface thereof. Annular slots 18 may be rectangular slots that extend in a regular fashion along the outside circumference of sleeve 16. Annular slots 18 may typically be 0.02 inches in depth and 0.10 inches in width. Similarly, a plurality of lands 20 may be provided between each annular slot 16 and may have a width of approximately 0.05 inches. Annular slots 18 and corresponding lands 20 are provided such that when sleeve 16 is internally expanded lands 20 contact the inside surface of tube 10 and are impressed therein thereby forming a substantially leak tight joint between sleeve 16 and tube 10 at that interface.

Sleeve 16 is also manufactured to have a notch 22 at the top end thereof that is formed to tightly hold an expander member 24 therein. With expander member 24 tightly placed in notch 22, sleeve 16 and expander member 24 can be inserted into a tube 10. Expander member 24 may be made of a metal such as Carpenter Custom 455 and have a bore 26 extending therethrough for allowing the coolant to pass through sleeve 16. Bore 26 may be internally threaded so as to be able to be threaded onto a threaded end of rod 28. When rod 28 is threaded into bore 26, rod 28 can be moved relative to sleeve 16 thereby pulling or pushing expander member 24 through sleeve 16. Rod 28 can be threaded into bore 26, after sleeve 16 has been positioned in tube 10.

Figure 2:
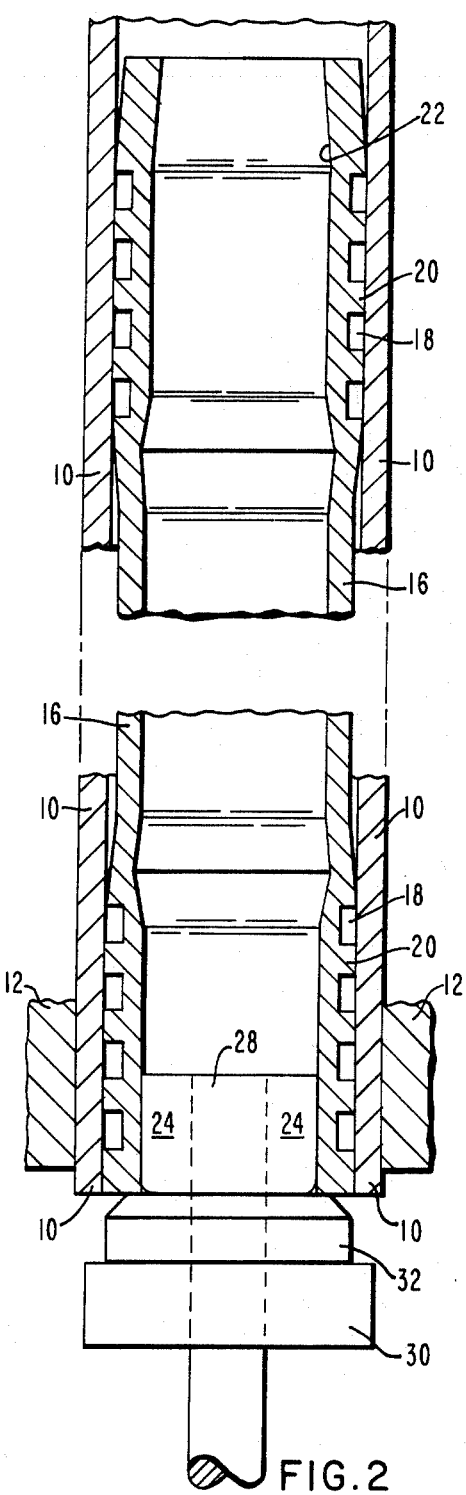
FIG. 2 is a cross-sectional view in elevation of the sleeve in the expanded position.

As can be seen in FIG. 1, the internal diameter of sleeve 16 in the region of sleeve 16 that has annular slots 18 is of a smaller diameter than that portion of sleeve 16 that has no annular slots 18. It should also be noted that the internal diameter of notch 22 and the external diameter of expander member 24 are chosen to be a greater diameter than the internal diameter of sleeve 16 in the portion of sleeve 16 that has annular slots 18. In addition, the internal diameter of the remainder of sleeve 16 is generally chosen to be larger than the external diameter of expander member 24. In this manner, expander member 24 can be held tightly in notch 22 but when expander member 24 is pulled through sleeve 16 by rod 28, expander member 24 will cause the portion of sleeve 16 that has annular slots 18 therein to expand into contact with tube 10 as shown in FIG. 2. This will be so because the size of expander member 24 will be chosen to be large enough to cause such an expansion. Of course, the actual size of expander member 24 will depend on the size of sleeve 16, tube 10, and the space therebetween. Because the internal diameter of the remainder of sleeve 16 is larger than the external diameter of expander member 24, expander member 24 can be pulled through the remainder of sleeve 16 with little effort.

In general, sleeve 16 may be formed to have at least two ends thereof formed with annular slots 18 as shown in FIG. 1. In this manner, sleeve 16 can be inserted into a tube 10 to bridge a defect in tube 10 such as defect 14. Thus, the movement of expander member 24 through sleeve 16 can cause the expansion of more than one section of sleeve 16 thereby creating more than one seal with tube 10. As can be seen in FIG. 1, if both ends of sleeve 16 are thus expanded, sleeve 16 will form a "bridge" over defect 14 which will allow fluid to pass through sleeve 16 and tube 10 without leaking through defect 14. Since bore 26 extends completely through expander member 24, expander member 24 may, but need not be, removed from sleeve 16 because the fluid can flow through bore 26.

Again referring to FIG. 1, rod 28 may be connected to rod actuator 30 which may be a fluid cylinder chosen from those well known in the art for moving rod 28 and expander member 24 relative to sleeve 16 thereby expanding sleeve 16 into contact with tube 10. Rod actuator 30 may be chosen to be capable of exerting approximately 20,000 lbs. of force on expander member 24. Rod actuator 30 may have a stop 32 mounted on the end thereof for holding sleeve 16 in tube 10 while rod 28 is moved relative to stop 32 and sleeve 16. In this fashion, rod 28 can pull expander member 24 through sleeve 16 while holding sleeve 16 in tube 10.

OPERATION

When it has been determined that a defect 14 has or may develop in a tube 10, the heat exchanger is drained of its fluid so that tube 10 may be accessed by working personnel or automated equipment. A sleeve 16 manufactured with annular slots 18 is then arranged so that rod 28 can be inserted therein. Rod 28 is then inserted into sleeve 16 and threaded into expander member 24. Expander member 24 may either be firmly held in notch 22 or may be loosely fitted therein before being threaded into rod 28. As rod 28 is threaded into expanded member 24, stop 32 is brought into contact with the bottom end of sleeve 16. When in this position, sleeve 16 is inserted into tube 10 as shown in FIG. 1. When thus inserted in tube 10, sleeve 16 is arranged to bridge defect 14.

Next, rod actuator 30 is activated which causes rod 28 to be moved downwardly relative to sleeve 16 and stop 32. The movement of rod 28 causes expander member 24 to be pulled through the portion of sleeve 16 that has annular slots 18 therein. The movement of expander member 24 causes sleeve 16 to expand into contact with the inner surface of tube 10 as shown in FIG. 2. The expansion of sleeve 16 also causes lands 20 to be impressed into tube 10 thereby creating a series of sealing surfaces extending circumferentially around the outer surface of sleeve 16. These sealing surfaces prevent fluid from passing between sleeve 16 and tube 10 thereby preventing leakage through defect 14.

As expander member 24 is continued to be pulled through sleeve 16, expander member 24 enters the portion of sleeve 16 where the internal diameter of sleeve 16 is larger than the external diameter of expander member 24. In this region, expander member 24 easily passes through sleeve 16 without causing that portion of sleeve 16 to expand.

If sleeve 16 is equipped with more than one portion with annular slots 18, then expander member 24 may be similarly pulled through that section thus creating a second sealing section as shown in FIG. 2. As an alternative, since the bottom portion of sleeve 16 may be accessible, the bottom portion of sleeve 16 can be welded or otherwise sealed to tube 10. Regardless of how the second seal is accomplished, expander member 24 may be removed from sleeve 16 or left therein. Likewise, more than one expander member 24 can be used in a single sleeve with each expander member used for a separate expansion. At the completion of the expansion process rod 28 and rod actuator 30 may be removed from sleeve 16.

Therefore, the invention provides a method for securing a sleeve within a heat exchange tube of a nuclear steam generator that produces a relatively leak tight joint between the sleeve and the tube so that no leakage occurs from the tube in the defective region.

We claim as our invention:

1. A method of securing a metal sleeve within a metal tube comprising:

positioning in said tube a metal sleeve having a series of regularly arranged rectangular slots extending around a first and a second portion of the outside surface thereof with said first portion and said second portion being separated by a section of said sleeve not having said slots therein and having an expander member disposed in said sleeve with said expander member having an external diameter greater than the internal diameter of said sleeve in the portions of said sleeve having said slots and with said expander member having an external diameter smaller than the internal diameter of said sleeve in the portions of said sleeve not having said slots;

threading a rod to a bore in said expander member for moving said expander member through said sleeve;

expanding said first portion of said sleeve having said slots therein into contact with the internal surface of said tube to seal said sleeve to said tube by moving said expander member through said first portion of said sleeve; and expanding said second portion of said sleeve having said slots therein by moving said expander member through said second portion.

2. The method according to claim 1 wherein said expansion of said sleeve is accomplished without removing said expander member from said sleeve.

3. A method of securing a metal sleeve within a metal heat exchange tube of a nuclear steam generator comprising:

arranging an expander member in a metal sleeve with said metal sleeve having a series of regularly arranged rectangular slots extending around a first and a second portion of the outside circumference of said sleeve and with said first portion and said second portion being separated by a section of said sleeve not having said slots therein, and with said expander member having an external diameter greater than the internal diameter of said sleeve in the portions of said sleeve having said slots and with said expander member having an external diameter smaller than the internal diameter of said sleeve in the portions of said sleeve not having said slots;

threading a rod to a bore in said expander member;

inserting said sleeve into said tube with said expander member and said rod disposed in said sleeve;

expanding said first portion of said sleeve having said slots therein into contact with the internal surface of said tube to seal said sleeve to said tube by moving said expander member through said sleeve; and expanding said second portion of said sleeve having said slots therein by moving said expander member through said second portion.

* * * * *